(12) United States Patent
Lepage

(10) Patent No.: US 6,561,342 B2
(45) Date of Patent: May 13, 2003

(54) GRANULAR MATERIAL CONVEYOR

(76) Inventor: Charles Lepage, Box 307, Vonda, Saskatchewan (CA), S0K 4N0

(*) Notice: Subject to any disclaimer, the term of this patent is extended or adjusted under 35 U.S.C. 154(b) by 0 days.

(21) Appl. No.: 09/828,009

(22) Filed: Apr. 6, 2001

(65) Prior Publication Data

US 2002/0063040 A1 May 30, 2002

Related U.S. Application Data

(63) Continuation-in-part of application No. 09/726,164, filed on Nov. 29, 2000.

(51) Int. Cl.[7] .............................................. B65G 47/34
(52) U.S. Cl. .............................. 198/550.1; 198/550.02; 198/625
(58) Field of Search ......................... 198/550.1, 550.01, 198/550.02, 625, 658

(56) References Cited

U.S. PATENT DOCUMENTS

| | | | | |
|---|---|---|---|---|
| 1,880,840 A | * | 10/1932 | Currier | 198/669 |
| 3,507,452 A | | 4/1970 | Dreyer et al. | 239/673 |
| 4,154,372 A | | 5/1979 | Ricciardi | |
| 4,282,703 A | | 8/1981 | Wilson et al. | |
| 4,313,705 A | | 2/1982 | Jackson | |
| 4,472,059 A | | 9/1984 | Klein et al. | |
| 4,534,461 A | | 8/1985 | Silverthorn et al. | |
| 4,535,884 A | * | 8/1985 | Suppan | 198/626 |
| 4,603,774 A | | 8/1986 | Siwersson et al. | |
| 4,619,577 A | | 10/1986 | Swanson | |
| 4,724,876 A | | 2/1988 | Ryan | |
| 4,875,820 A | | 10/1989 | Lepp et al. | |
| 5,176,295 A | * | 1/1993 | Stefanik | 222/271 |
| 5,238,346 A | | 8/1993 | Grathoff | |
| 5,299,888 A | | 4/1994 | Wysong et al. | |
| 5,615,989 A | * | 4/1997 | Matousek et al. | 414/502 |
| 5,642,977 A | | 7/1997 | Hanson et al. | |
| 5,667,350 A | | 9/1997 | Arend et al. | |
| 5,735,386 A | * | 4/1998 | Epp et al. | 198/550.01 |
| 5,967,427 A | | 10/1999 | Seymour | |
| 5,967,656 A | * | 10/1999 | Andersson et al. | 366/131 |
| 6,050,456 A | | 4/2000 | Soper et al. | 222/272 |
| 6,068,103 A | | 5/2000 | Werner | |

FOREIGN PATENT DOCUMENTS

| | | | |
|---|---|---|---|
| CA | 1113029 | 11/1981 | |
| CA | 1228319 | 10/1987 | |
| CA | 2026463 | 10/1996 | |
| CA | 2205256 | 5/1998 | |
| CA | 2123257 | 2/1999 | |
| GB | 1543237 | 9/1976 | B65G/47/34 |

\* cited by examiner

*Primary Examiner*—Douglas Hess
(74) *Attorney, Agent, or Firm*—Michael Best Friedrich LLP

(57) ABSTRACT

Disclosed is an improved conveyor. The invention provides an apparatus for conveying material having an elongated tube with an input end and a discharge end, an intake hopper having a front end secured to the input end of the tube and an endless belt for conveying material from the intake hopper to the discharge end of the tube. Mounted within the intake hopper is at least two augers positioned above the endless belt and external to the input end of the tube. The endless belt and the augers are driven with appropriate drive means. Rotation of the augers conveys granular material in the hopper toward the input end of the tube so as to flood feed the input end of the tube. The granular material is then carried to the discharge end of the tube by the belt.

4 Claims, 5 Drawing Sheets

GRANULAR MATERIAL CONVEYOR

This application is a continuation-in-part of U.S. patent application Ser. No. 09/726,164 filed on Nov. 29, 2000.

FIELD OF INVENTION

The invention relates to an improved apparatus for conveying granular material.

BACKGROUND

It is known to use screw type conveyors and belt type conveyors for conveying granular material from a location near the ground to an elevated position.

Screw type conveyors typically include an auger mounted within a tube. The auger typically has a diameter only slightly smaller than the inner diameter of the tube or channel. Rotation of the auger drives granular material up the tube or channel to be discharged at an upper end. Screw type conveyors typical have high flow rates as the material is conveyed along substantially the entire cross-section of the tube. However, some granular materials such as fertilizer and sensitive Feeds (i.e. peas, lentils, beans and canola), are susceptible to damage when conveyed in a screw type conveyor. Such damage results in reduced grade of the granular material and/or lower germination rates of the seed.

Endless belt type conveyors typically include an endless belt mounted in an elongated transport body. The belt is rotated to transport material up the transport body. Belt type conveyors cause significantly less damage to granular material than the screw type conveyors. However, the flow rate of this type of conveyor is comparatively lower than that of screw type conveyors.

The use of belt conveyors mounted in tubes is also known. Further, it is known to use augers mounted above such belts within intake feed hoppers of conveyors for assisting feed of material to be conveyed to the tube conveying portion of such conveyors. One type of such conveyor includes a tapered auger extending into the tube above the belt. However, having the auger member extend into the tube may limit the flow rate of the conveyor since a portion of the cross-section of the tube at the intake end is occupied by the auger. Further, the use of a single auger in a feed hopper is problematic since the single auger tends to load the belt on one side which may result in misalignment of the belt and damage thereto. In addition, the relatively large size required for a single auger increases the height of the intake hopper making it inconvenient to unload certain bottom dumping hoppers into the intake hopper. Further, the mounting of the auger such that it extends into the tube limits the ability to adjust the positioning of the auger in the intake hopper and does not provide the flexibility necessary to ensure positive clean out of the majority of the hopper. It also limits the ability to vary the size of the auger and, depending upon the material to be conveyed, damage may be caused by the auger to that material. Finally, the use of a single auger in the intake hopper promotes spillage since, as noted, a single auger tends to load the belt (and the intake hopper) on one side.

SUMMARY OF INVENTION

It is an object of the invention to provide an improved conveyor.

According to a broad aspect of the invention, the invention provides an apparatus for conveying material comprising an elongated tube having an input end and a discharge end; an intake hopper at the input end of the tube; an endless belt passing through the intake hopper and elongated tube and returning to the intake hopper outside the tube, said belt being adapted to be rotated for transporting material from the intake hopper to the discharge end of the tube; at least two augers mounted in the intake hopper, positioned above the endless belt; and drive means for driving the endless belt and rotating the said augers; wherein rotation of the said augers conveys granular material in the intake hopper toward the input end of the tube.

In one embodiment of the invention, the invention provides for the location of the augers in the hopper to be adjusted and facilitates easy removal and replacement of the augers. Further, the speed at which the augers are to be driven is adjustable. The foregoing provides great flexibility with respect to different applications which the conveyor will be used for. In another embodiment of the invention the augers are mounted at a fixed position above the belt.

The invention also provides for a conveyor having a low profile intake hopper. This facilitates use of the conveyor with bottom dumping hoppers, etc. which have little clearance for locating the intake hopper underneath. Where a low profile but high volume hopper is required, a wide hopper may be utilized in conjunction with additional augers located toward the rear of the hopper and adapted for moving material from the sides of the hopper towards the center where it will be transported by the belt and augers to the front end of the hopper and the input end of the tube.

Generally, the invention attempts to provide a conveyor with high flow rates by providing flood feeding of the conveyor at the point where the belt enters the tube. The conveyor of the present invention is also versatile in that the orientation, size and material of the augers and the speed at which they are driven may be changed depending upon the application for which the conveyor is being utilized.

BRIEF DESCRIPTION OF THE DRAWINGS

Preferred embodiments of the invention will now be described by way of example with reference to the attached drawings in which.

DETAILED DESCRIPTION OF PREFERRED EMBODIMENTS

Figure 1:
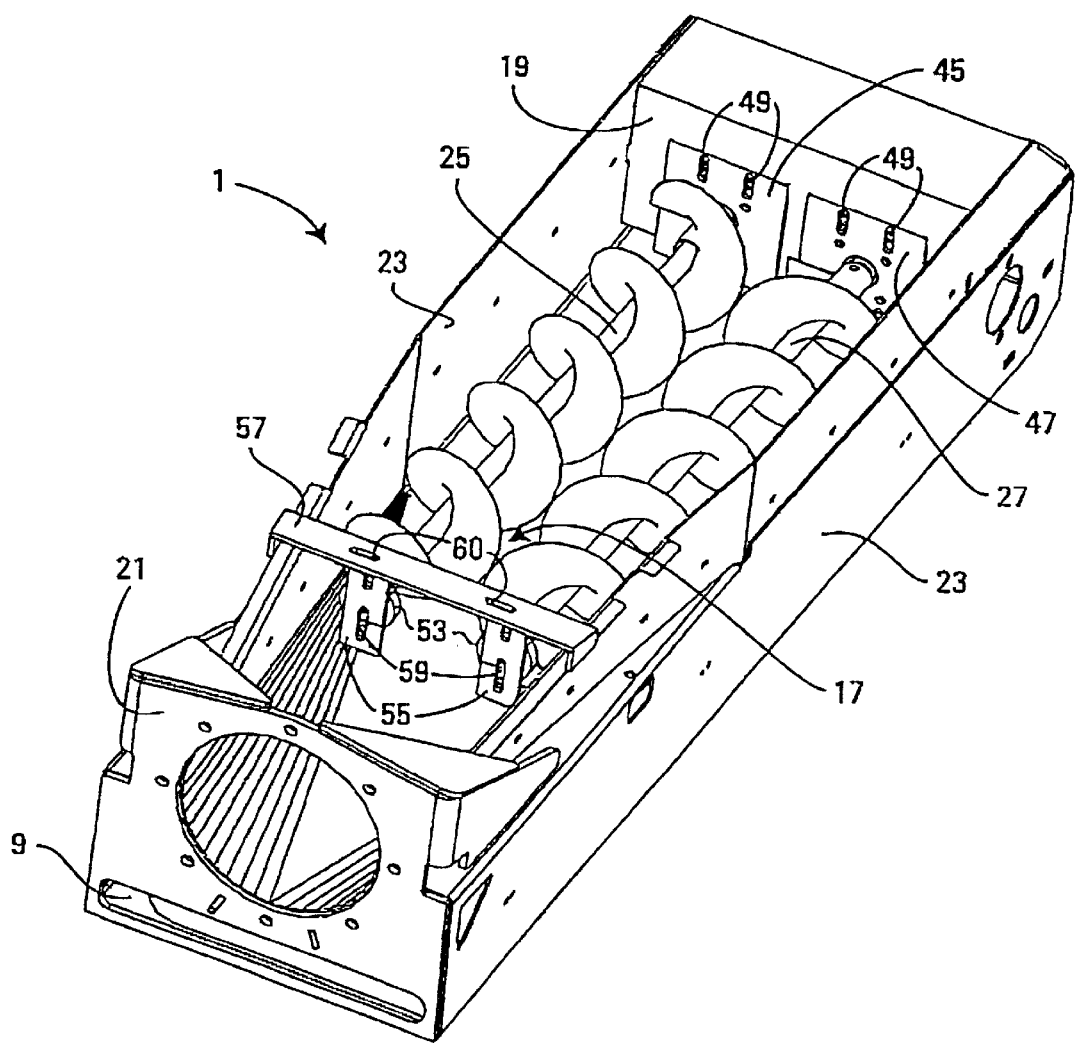
FIG. 1 is a perspective view of the intake hopper of a conveyor according to one embodiment of the invention.
Figure 2:
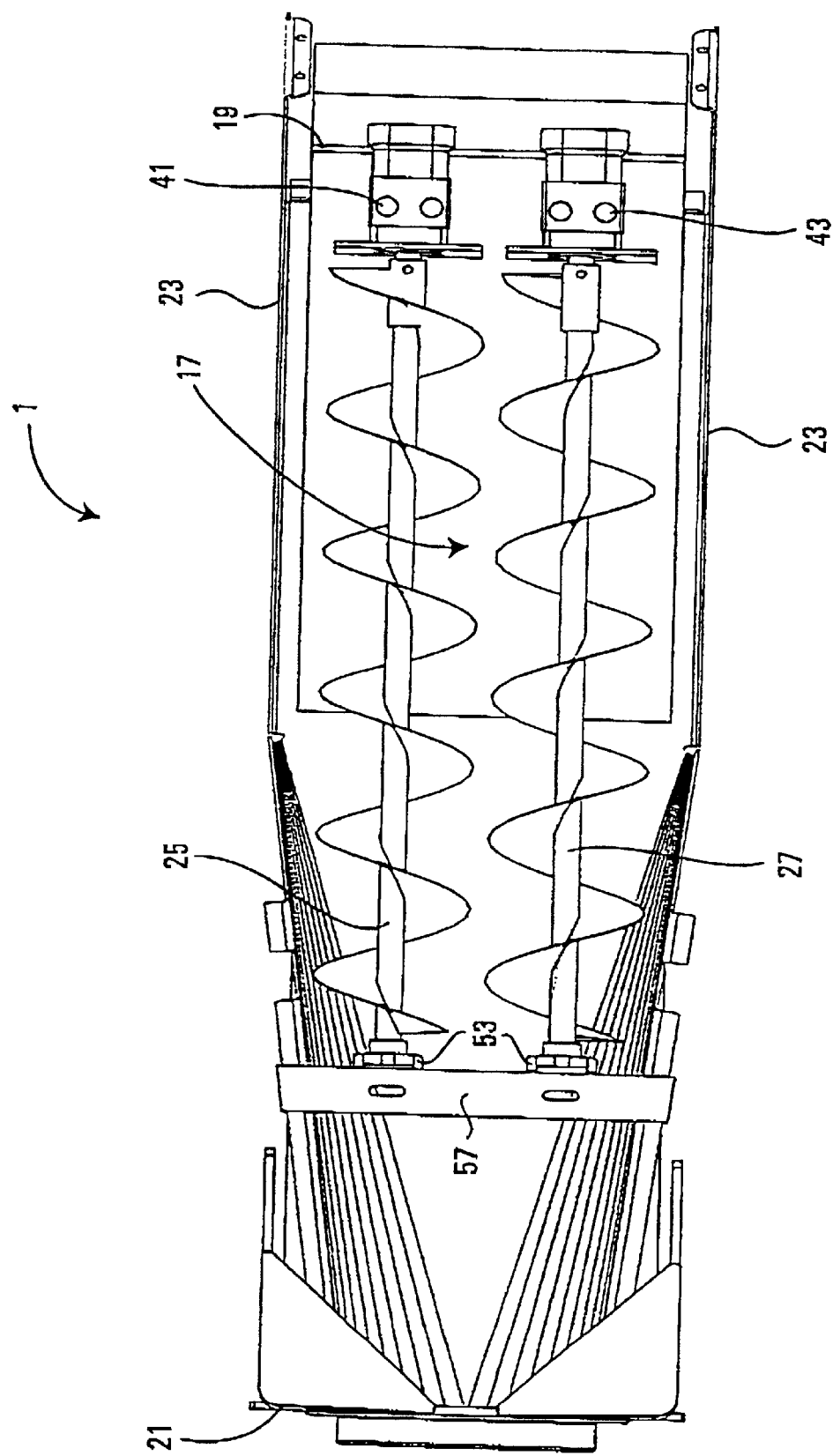
FIG. 2 is a top view of the intake hopper of a conveyor according to one embodiment of the invention.
Figure 3:
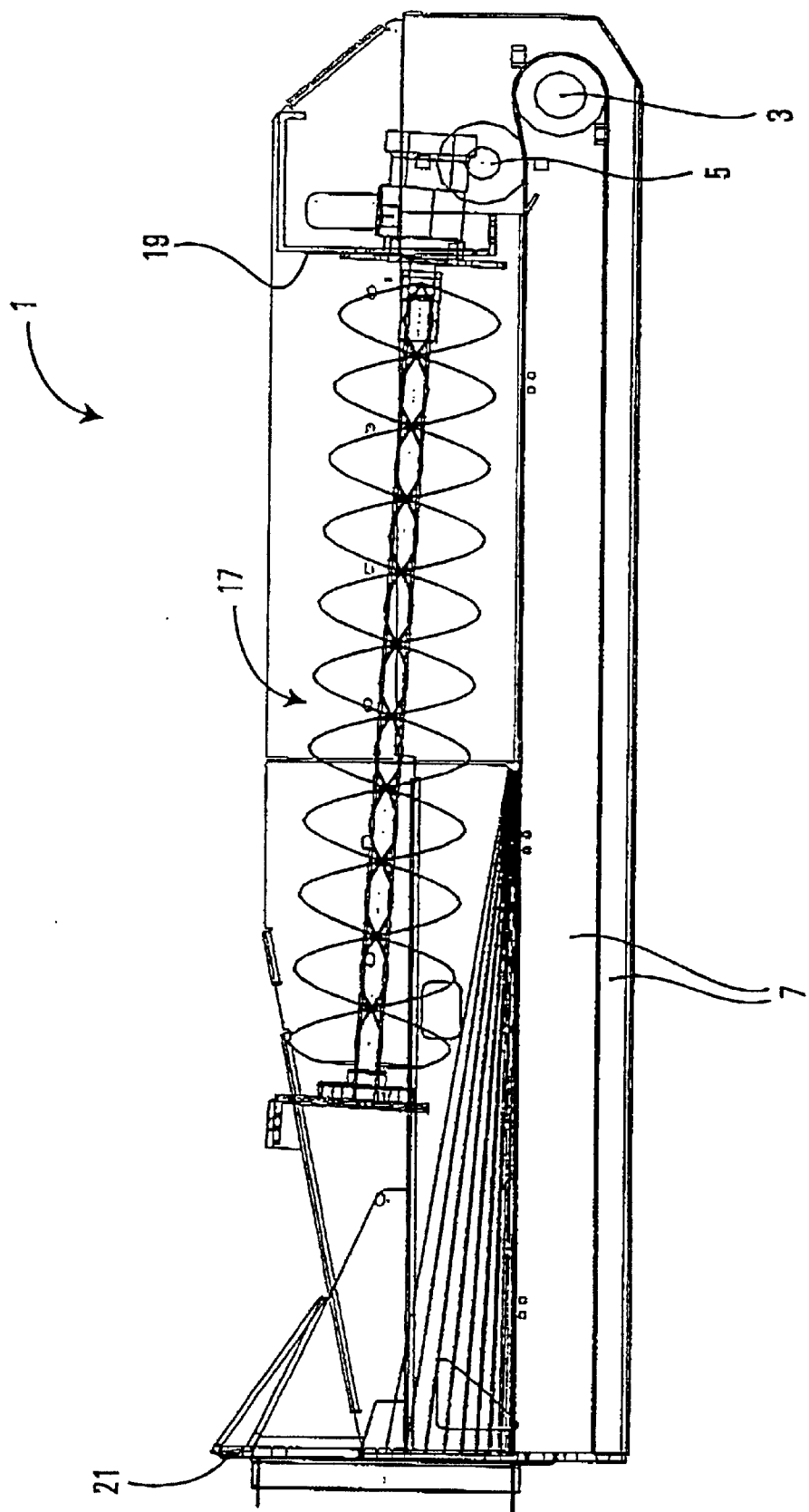
FIG. 3 is a side view of the intake hopper of a conveyor according to one embodiment of the invention.
Figure 4:
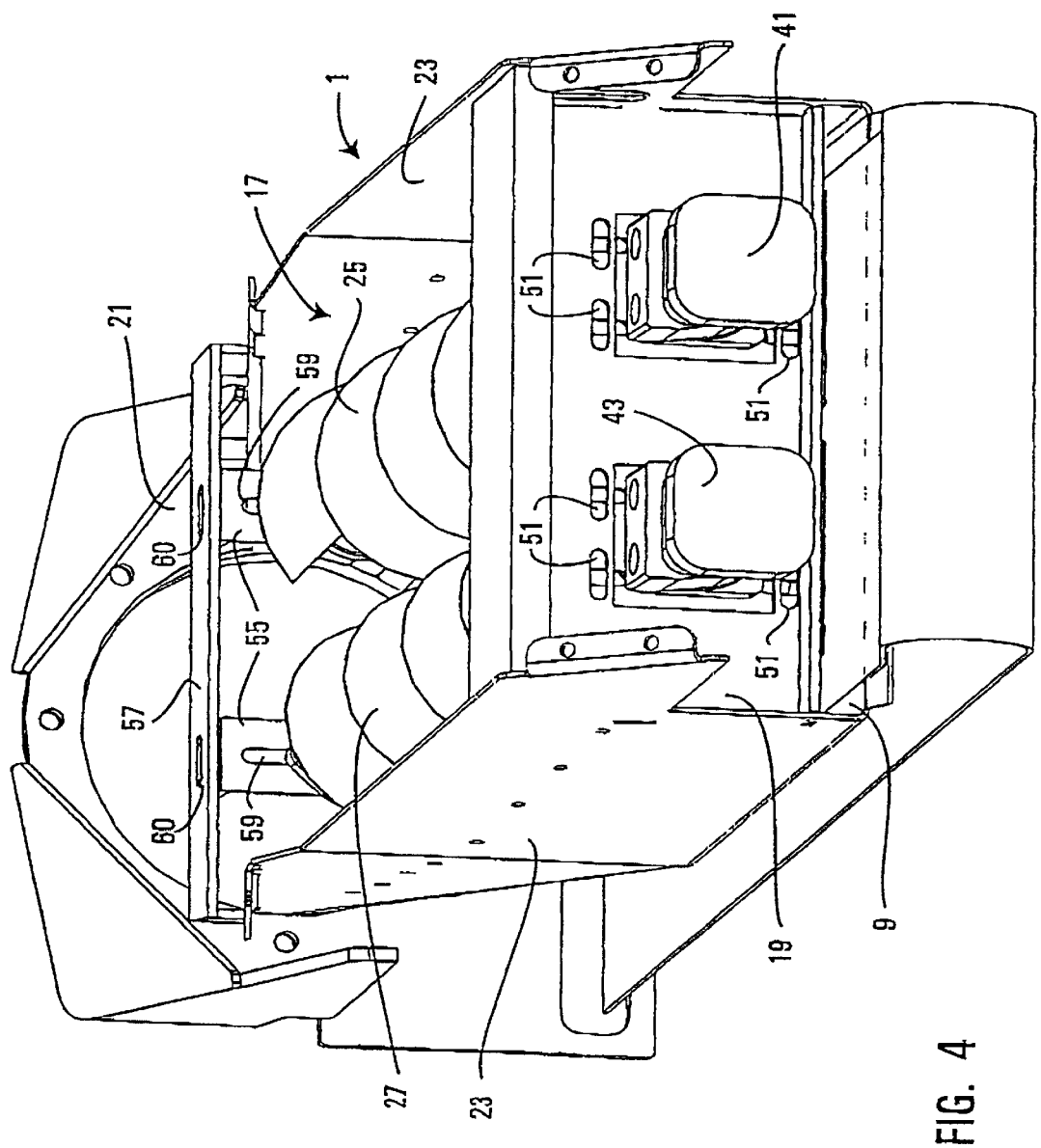
FIG. 4 is a perspective view of the rear end of the intake hopper of a conveyor according to one embodiment of the invention.

FIGS. 1 to 4 show a conveyor according to one embodiment of the invention which includes an intake hopper section 1, a discharge section (not shown) and an elongated conveying tube (not shown) extending therebetween. An endless belt 7 is mounted on a set of rollers including rollers 3, 5 (see FIG. 3) such that the belt has a transport run which passes through the feed hopper section 1 where it is guided into the conveying tube and thence through the conveying tube to the discharge section (not shown). A return run of the belt 7 passes outside of the tube from the discharge section back to the feed hopper section 1 passing between rollers 3 and 5 and through slot 9 (see FIGS. 1 and 4) and thence again through the feed hopper and back into the tube.

The feed hopper section 1 comprises a hopper 17 having a back wall 19, a front end 21 and side walls 23. At the beginning of a transport run, the belt 7 passes through the slot 9 at the back wall 19 and extends to the front end 21 of the hopper where it enters the tube (not shown). Preferably, the side walls 23 of the hopper 17 are arranged such that, as the belt 7 moves towards the front end 21 of the hopper, the walls gradually urge the belt into a hemispherical configuration. This assists the belt 7 in conforming to the shape of the tube and entering the tube while reducing wear on the belt 7 and hopper 17 as a result of the belt entering the tube.

The input end of the tube (not shown) forms a closed connection with the front end 21 of the feed hopper 17. The connection between the hopper feed section 1 and the tube can be effected in any number of conventional ways including bolting flanges on the tube and hopper together, welding, etc.

Two auger members 25 and 27 are mounted in the hopper 17 positioned above the belt 7. Each of the auger members 25 and 27 have one end bolted to the shaft of respective drive motors 41 and 43. The motors and augers are retained on the back wall 19 of the hopper through mounts comprising bolt and slot arrangements between plates 45 and 47 and back wall 19. As best seen in FIG. 1, the plates include generally vertically oriented slots 49 which allow for vertical adjustment of the height of the auger relative to the hopper toward the back of the feed hopper 1. The vertical slots 49 are aligned with horizontal slots 51 (see FIG. 4) on the back wall 19. The horizontal slots 51 allow for adjustment of the horizontal orientation of the augers 23, 25 in the hopper 17.

The other end of each of the augers is mounted toward the front of the hopper 17 through mounts including bearings 53 which are bolted to bearing holders 55. The bearing holders 55 are in turn connected to bracket 57 as is clearly shown in FIGS. 1 and 2. It will be noted that the bearing holders 55 include generally vertically oriented slots 59 which facilitate vertical adjustment of the auger flights. It will also be noted that the bracket 57 includes generally horizontal slots 60 which allow for horizontal adjustment of the orientation of the augers 25 and 27 relative to the front end of the hopper 17.

Due to the manner of mounting the augers in the hopper, removal, replacement or substitution of augers may be easily performed. Further, depending upon the applications to which a user will put the conveyor, there may be benefits to using augers having flights made of different materials or augers of different size. More specifically, with respect to the flighting material, any suitable commercially available flighting may be used including steel, plastic or brush flighting. There will generally be a benefit to the use of plastic or brush flighting since those types of flighting cause less damage to the material being conveyed than does steel flighting. However, due to the dual auger arrangement, as discussed further below, it is preferable to have both right and left hand flighting. Augers are commercially available with steel flighting in both left and right hand orientation. With respect to plastic and brush flighting, it may be necessary to make a special order for left hand oriented flighting. Further, steel flighting may wear less quickly than either plastic or brush flighting. Accordingly, steel may be advantageous from a costing point of view.

With respect to the size of the auger flighting, different sizes of augers may be optimal depending upon the type of material being conveyed. The smaller the flighting, generally the less damage which will be caused to the particulate material since there will be less contact on that material with smaller auger flighting. Further, there is a benefit to the use of smaller diameter flighting since that will allow for a lower profile of the feed hopper 17 thereby facilitating loading from a chute located relatively close to the ground. This can be quite important where, for instance, the conveyor will be used to convey material being deposited from a bottom discharging container. Generally, the appropriate diameter for the flights will depend upon the hopper dimensions as well as the particulate material to be conveyed.

As noted, it is preferable to use left and right hand oriented auger flights in the hopper. This is desirable to minimize spillage since, properly arranged, the oppositely oriented augers will tend to move the particulate material toward the middle of the feed hopper 17 as material is conveyed to the front end of the hopper.

In view of the adjustability of the augers relative to the hopper and the separate adjustability of the opposing ends of each auger, it is necessary to provide for pivoting of the auger about the connections of the auger to the hopper. In the illustrated embodiment, the necessary freedom of movement is accomplished by allowing for some play of the bolts in the slots. However, any other suitable means allowing for freedom of movement may be utilized.

Figure 5:
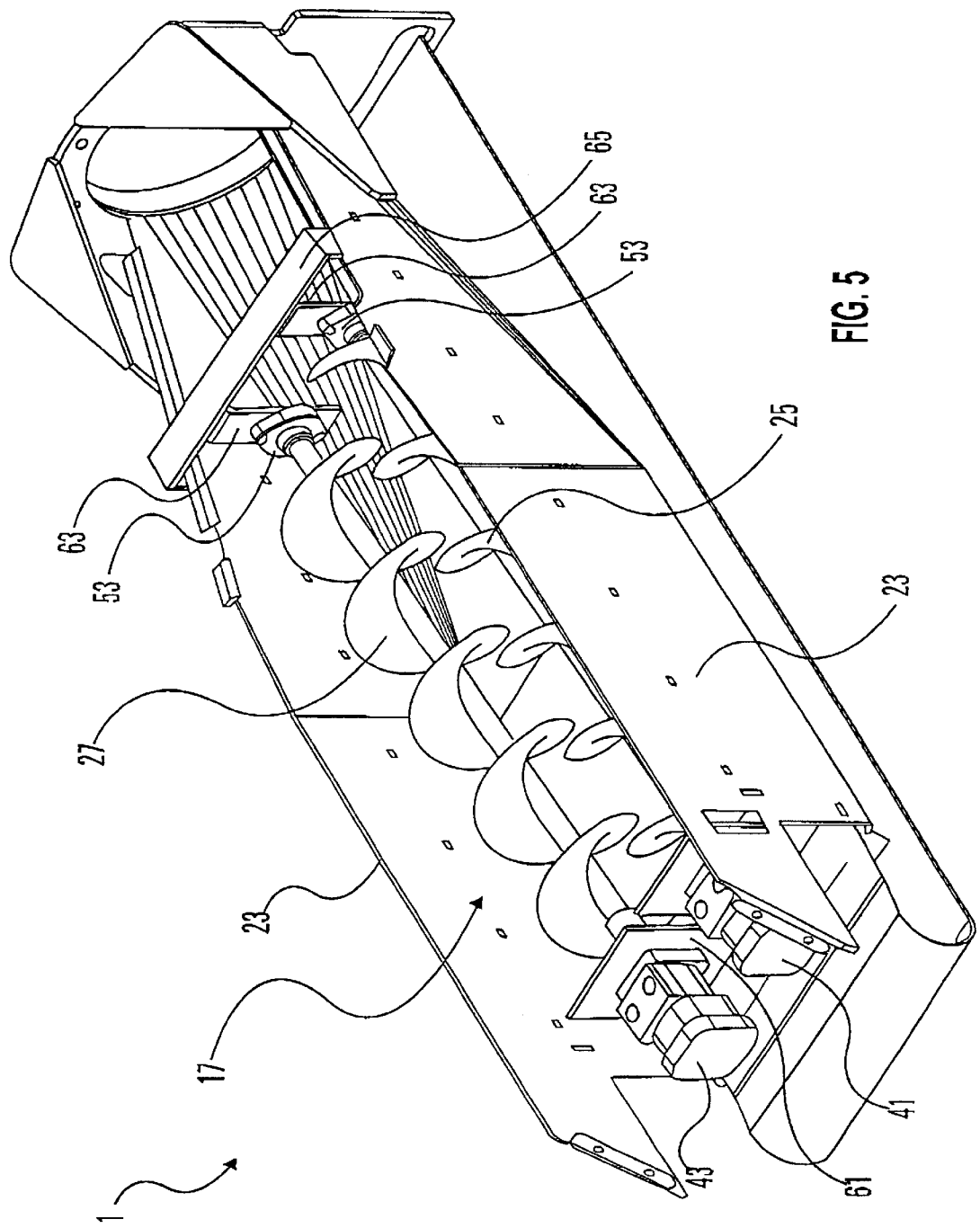
FIG. 5 is a perspective view of the intake hopper of a conveyor according to another embodiment of the invention.

FIG. 5 illustrates an alternative embodiment of the invention with the two auger members 25 and 27 mounted in the hopper 17 in a fixed position above the belt 7. The hopper 17 has a back wall 61 connected to each side wall 23. Each of the auger members 25 and 27 have one end bolted to the shaft of respective drive motors 41 and 43. The drive motors 41 and 43 and auger members 25 and 27 are retained in the back wall 61 at a fixed position above the belt 7.

The other end of each of the augers is mounted toward the front of the hopper 17 through mounts including bearings 53 which are bolted to bearing holders 63. The bearing holders 63 are in turn connected to bracket 65. Mounted in this manner, the augers 25 and 27 are maintained at a fixed position above the belt 7.

As will be noted from the foregoing, in the examples shown in the Figures, a dual engine drive system is used for driving the augers. Preferably, the drive motors will be variable speed. In operation, the optimal speed of operation of the augers may vary depending upon the application including the angle at which the conveyor is to be operated and the type of material to be conveyed. However, generally, each of the augers will be driven at the same speed. Accordingly, a single drive motor may be utilized with suitable chain drives. Even more generally, any known drive system for driving an auger which does not unduly inhibit the ability to adjust the orientation of the augers 25 and 27 in the feed hopper 17 may be utilized.

Generally, in operation, the auger members 25 and 27 are rotated such that particulate material deposited within the hopper 17 engages with one of the auger members which assists in driving the material toward the center of the front end 21 of the hopper. In the embodiments shown in the Figures, the auger member 25 has left hand flighting and is rotated in a clockwise direction whereas auger member 27 has right hand flighting and is rotated in a counterclockwise direction. Reference to the direction of rotation of each of the auger members 25 and 27 is as it would be viewed from the back wall 19 or 61 toward the front end 21 of the hopper 17.

As material is fed into the hopper 17, it is carried toward the front end 21 by the belt 7 and/or the augers 25 and 27.

As the material moves toward the front end 21, the belt 7 is bent by the converging portions of side walls 23 into a hemispherical configuration for insertion into the input end of the tube. The rotation of the auger member 25 and 27 combined with the movement of the belt 7 provide a continuous flow of granular material to the front of the hopper 17. When high flow rates are required, the augers can be operated such that the action of the auger members 25 and 27 provide a continuous full flow of the material being conveyed to the front end of the hopper 17 and the input section of the tube. As a result, the belt and tube conveyor provides for "flood feeding" which promotes high flow rates for the conveyor as a whole.

While the figures do not show alternate configurations, those skilled in the art will understand that various combinations of elements may be utilized which would be within the concept of the present invention. For instance, in addition to the belt and dual augers which are utilized to transport particulate material toward the tube portion of the conveyor, additional augers may be added in a larger hopper for transporting material to the belt for movement under action of the belt and dual feed augers 25 and 27.

Generally, it will be understood by those skilled in the art that numerous alterations, modifications of variations to the above embodiments can be made without departing from the substance of the invention as set out in the appended claims.

I claim:

1. An apparatus for conveying material comprising:
    a) an elongated tube having an input end and a discharge end;
    b) an intake hopper mounted at the input end of the tube;
    c) an endless belt passing through the intake hopper and elongated tube and returning to the intake hopper outside the tube, the belt being adapted to be rotated for transporting material from the intake hopper to the discharge end of the tube;
    d) at least two augers mounted in the intake hopper, positioned above the endless belt, the augers including a left and a right auger, each of which extends from a rear portion of the intake hopper toward the front end thereof; and
    e) drive means for driving the endless belt and rotating the augers;
    wherein rotation of the augers conveys granular material in the intake hopper toward the input end of the tube; and
    wherein at least one auger is mounted using adjustable mounts adapted to adjust the location and orientation of the auger relative to the intake hopper and belt.

2. An apparatus as claimed in claim 1 wherein a first end of each auger is mounted through a bearing to a bearing holder which is in turn mounted on brackets toward the front end of the intake hopper and wherein the connection between the bearing holder and the brackets provides for adjustment of the location of the bearing relative to the intake hopper.

3. An apparatus as claimed in claim 2 wherein a second end of each auger is connected to the drive means for driving the auger and wherein said second end is mounted on the intake hopper such that the location of said second end of each auger may be adjusted relative to the intake hopper.

4. An apparatus as claimed in claim 3 wherein said drive means include separate motors connected to each auger and wherein the location of each motor is adjusted as the location of the second end of the respective auger is adjusted.

* * * * *